Patented Dec. 30, 1941

2,268,110

UNITED STATES PATENT OFFICE 2,268,110

CRACKING OILS USING SYNTHETIC CATALYTIC COMPOSITIONS

Gerald C. Connolly, Baton Rouge, La., assignor to Standard Oil Development Company, a corporation of Delaware No Drawing. Application December 6, 1938, Serial No. 244,182

2 Claims. (Cl. 196—52)

This invention deals with the use of superior activated synthetic gel catalysts and especially to the use of such catalysts for the catalytic cracking of hydrocarbons such as those occurring in petroleum. More particularly, this invention relates to the use of certain elements containing 4 electronic orbits as classified in the periodic chart of the atoms, and having atomic weights between 54 and 56, for improving the catalytic cracking activity of various synthetic gel catalytic masses.

Certain metal compounds such as silica and alumina have the property of existing in the hydrogel form, which, upon drying, yields a very porous mass, (dried gel) of high catalytic activity. These hydrogels are generally prepared by allowing a hydrosol to "set" until a considerable portion of the reaction liquid is imbibed by some sort of colloidal structural arrangement. Two different hydrogels may be intimately mixed to obtain a mechanical mixture (mixed gel), which upon drying, may have superior properties over either one of the individual constituents. Plural hydrogels are obtained by allowing a mixed hydrosol of different metal compounds to "set." Impregnated gels may be prepared by soaking washed hydrogels in different salt solutions so that the latter are completely dispersed throughout the mass. Gelatinous precipitates differ from hydrogels by the fact that they separate from the liquor as a slimy fluid jelly in a separate phase leaving some supernatant liquid above. A heterogeneous gel, on the other hand, is a gelatinous precipitate dispersed in a hydrosol and allowed to "set" or "gel."

For the purposes of this invention, the term "hydrous oxide jelly" will be employed to designate all gels other than those in the dried form which no longer possess the flexible characteristics attributable to gels containing appreciable amounts of imbibed water.

For example, a hydrosol of silica may be prepared by mixing equal volumes of 25° Bé. sodium silicate solution and 23° Bé. sulfuric acid solution. In 3–5 hours, the hydrosol sets to a silica hydrogel, imbibing all of the reaction liquids. The hydrogel may be broken up, washed free of reaction salts, formed if desired and dried. Hydrous alumina hydrogel may be prepared by mixing with stirring, a solution of 10 kg. of $$Al_2(SO_4)_3.18H_2O$$

dissolved in 100 liters of water with 100 liters of 1 N. $NH_4OH$, and washing by decantation with distilled water. A mechanical mixture of the two hydrogels is obtained by intimate mixing of the two washed hydrogels.

Plural hydrogels of silica and alumina in the ratio of 12:1 may be prepared by adding a volume of 23° Bé. sulfuric acid solution containing aluminum sulfate equivalent to one mole of $Al_2O_3$, to an equal volume of 25° Bé. sodium silicate solution. After the hydrogel has set, it is washed with distilled water.

Impregnated gels having molal ratios of about $12SiO_2:1Al_2O_3$ are prepared by soaking washed silica hydrogel overnight in a 30% solution of $Al(NO_3)_3.9H_2O$, draining, drying, and decomposing the aluminum nitrate by heat. These dried products of hydrogels which no longer retain their spongy characteristics are known as dried gels.

The present invention is specifically concerned with the use of dried gel catalysts containing the elements with 4 electronic orbits as classified in the periodic chart of the atoms, and having atomic weights between 54 and 56, the elements being manganese and iron. The periodic chart of the atoms herein referred to has reference to the table entitled "Periodic Chart of the Atoms", compiled and revised by H. G. Hubbard of the U. S. Bureau of Standards, Washington, D. C., and published by the M. W. Welch Manufacturing Company of Chicago, Ill. Since the reason for the promoting action of these elements is unknown, it is impossible to postulate any type of structural changes effected by these materials within the catalytic masses. The metal elements appear to function more effectively in the presence of silica than in other gels. The effectiveness of these catalysts is also limited to atomic weight ranges of between 54 and 56, since it has been found that elements outside of this range such as cobalt and nickel tend to inactivate the gel catalysts even when present in small concentrations. These elements, added preferably in the form of their water soluble salts, may be incorporated in the hydrosol or heterogeneous gel stages or employed as a mixed hydrous gel or used for impregnating hydrous or dried gels. The amount of these elements added to these catalysts is very small, preferably not over about 0.5% to 1%, since it has been found that higher amounts detrimentally affect the activity of the gel catalysts. Although silica-alumina gels are preferred as base stocks, the invention is not limited to this material but is applicable to other hydrous oxide gels possessing some catalytic activity.

In the preferred procedure, it is desirable to employ co-impregnated silica hydrogels obtained by soaking the purified silica hydrogel produced in known manner in a mixed solution of a soluble aluminum salt such as aluminum nitrate, and a soluble salt (usually the ammonium salt or the nitrate) of the metal promoter desired. The resulting product is drained, dried, decomposed by heating, and ground or formed, if desired.

It has been found that although alumina-silica gels are fairly active catalysts for cracking reactions, their cracking activity can be appreciably improved by the addition of small amounts of these promoters, which comprise salts of manganese and iron, or mixtures thereof.

The invention can be more clearly understood by reference to the following examples, which, however, are not intended to limit the invention in any respect:

*Example 1.*—A purified silica hydrogel was prepared and impregnated with aluminum nitrate so that the dried gel produced contained about 12.5% of alumina. This gel had a density of 0.600 and was employed for the cracking of West Texas gas oil of 33.8 A. P. I. gravity for a period of 2 hours at a temperature of 855° F., and a feed rate of 0.615 vol./vol./hr. The amount of gasoline obtained was 50% by volume. The liquid product had an A. P. I. gravity of 46.9 and the rejected gas obtained amounted to 11.6 liters per hundred grams of liquid product, the gas density being 0.98.

*Example 2.*—The same silica hydrogel as that described in Example 1 was impregnated with a mixture of aluminum nitrate and a manganese salt so that the resulting dried gel contained about 12.5% $Al_2O_3$ and 0.1% MnO. The apparent density of the catalyst was 0.627. When employed for the cracking of the gas oil under conditions shown in Example 1, the gasoline yield obtained was 53.5%, showing an increased activity over the unpromoted catalyst given in Example 1.

*Example 3.*—A catalyst was prepared as in Example 2, except that it contained 1.5% MnO instead of 0.1%, and the apparent density of the catalyst was 0.600. The gasoline yield with this catalyst was 45.5%, showing a decided drop in activity by further addition of the promoter.

*Example 4.*—This catalyst was similar to that in Example 2, except that it contained 5% MnO instead of 0.1%. Using this catalyst, the cracking operation yielded 45% gasoline, which is a somewhat lower yield than that obtained in the previous example, showing that further addition of the promoter had a somewhat greater detrimental effect.

*Example 5.*—A co-impregnated silica hydrogel was prepared as in Example 2, except that an iron salt was employed as a promoter instead of a manganese salt, and the final catalyst contained 0.1% $Fe_2O_3$, the apparent density being 0.67 with this catalyst. A gasoline yield of 54.5% was obtained, showing that the small amount of the iron effected beneficial increase in activity.

Although these catalysts operate most satisfactorily when employed for cracking operations, especially in the cracking of petroleum hydrocarbons, they may be advantageously employed for catalyzing other reactions such as dehydrogenation, alkylation, isomerization, aromatization, polymerization and the like.

Various modifications may be made within the scope of the present disclosure, and the invention is not limited to any particular examples or theory of operation, but only by the following claims in which it is intended to cover the invention as broadly as the prior art permits.

I claim:

1. A method of cracking hydrocarbon oil which comprises passing said oil through a cracking zone containing a catalyst comprising synthetic silica-alumina gel containing manganese oxide, the amount of said manganese oxide contained in said catalyst being of the order of 0.1% and maintaining said oil within said cracking zone in contact with said catalyst for a period sufficient to obtain the desired cracking thereof.

2. A method of cracking hydrocarbon oils which comprises passing said oils through a cracking zone containing a catalyst comprising synthetic silica-alumina gel and not more than 1% of manganese oxide formed by impregnating a hydrous oxide of silica with decomposable salts of aluminum and manganese and thereafter drying the impregnated oxide and decomposing the salts into the corresponding oxides and maintaining said oil in contact with the catalyst while at cracking temperature for a period sufficient to obtain the desired cracking thereof.

GERALD C. CONNOLLY.